Nov. 11, 1924.                    E. MORRISON                    1,515,130
                                    FILTER
                       Filed July 21 1920       4 Sheets—Sheet 3

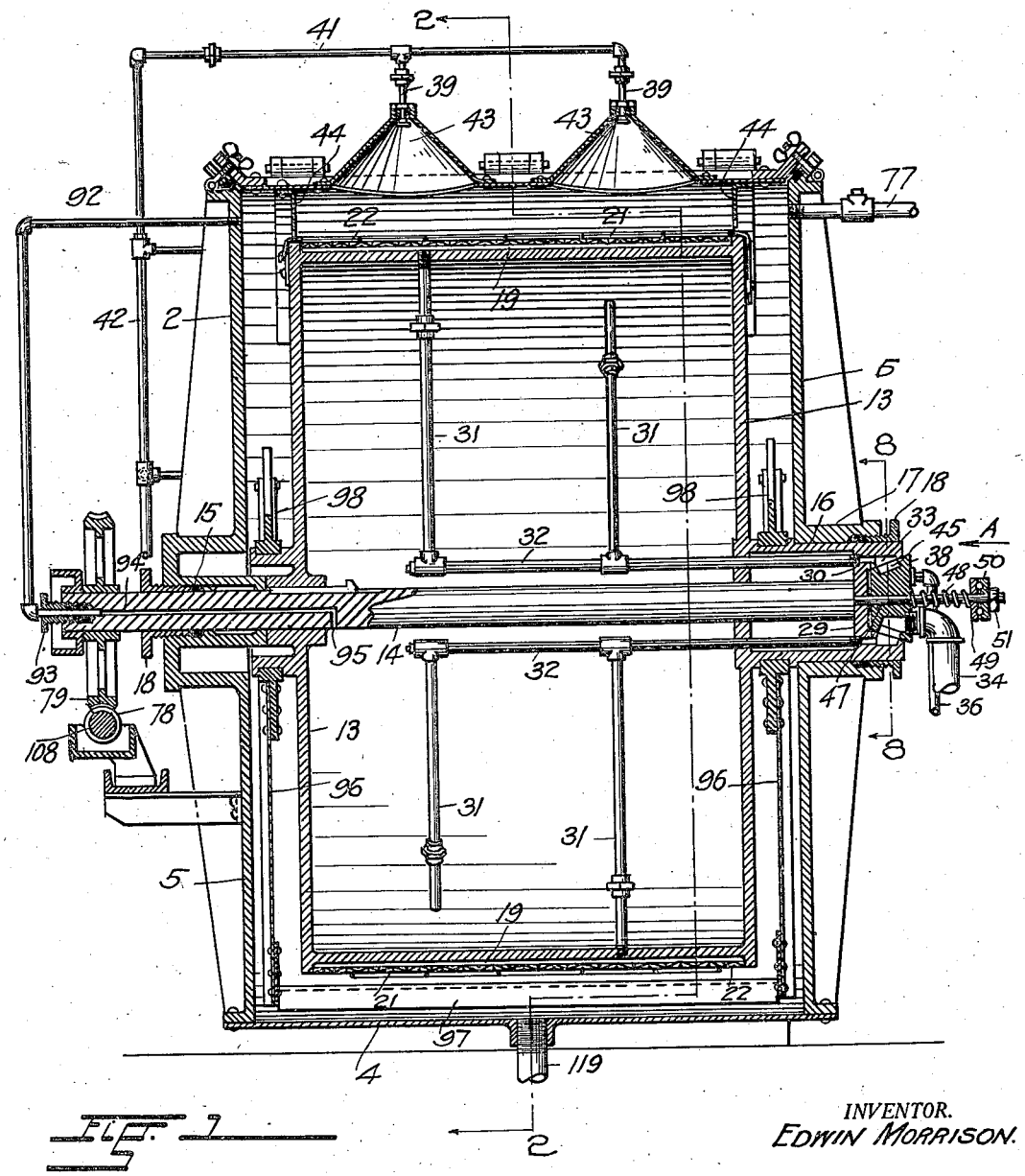

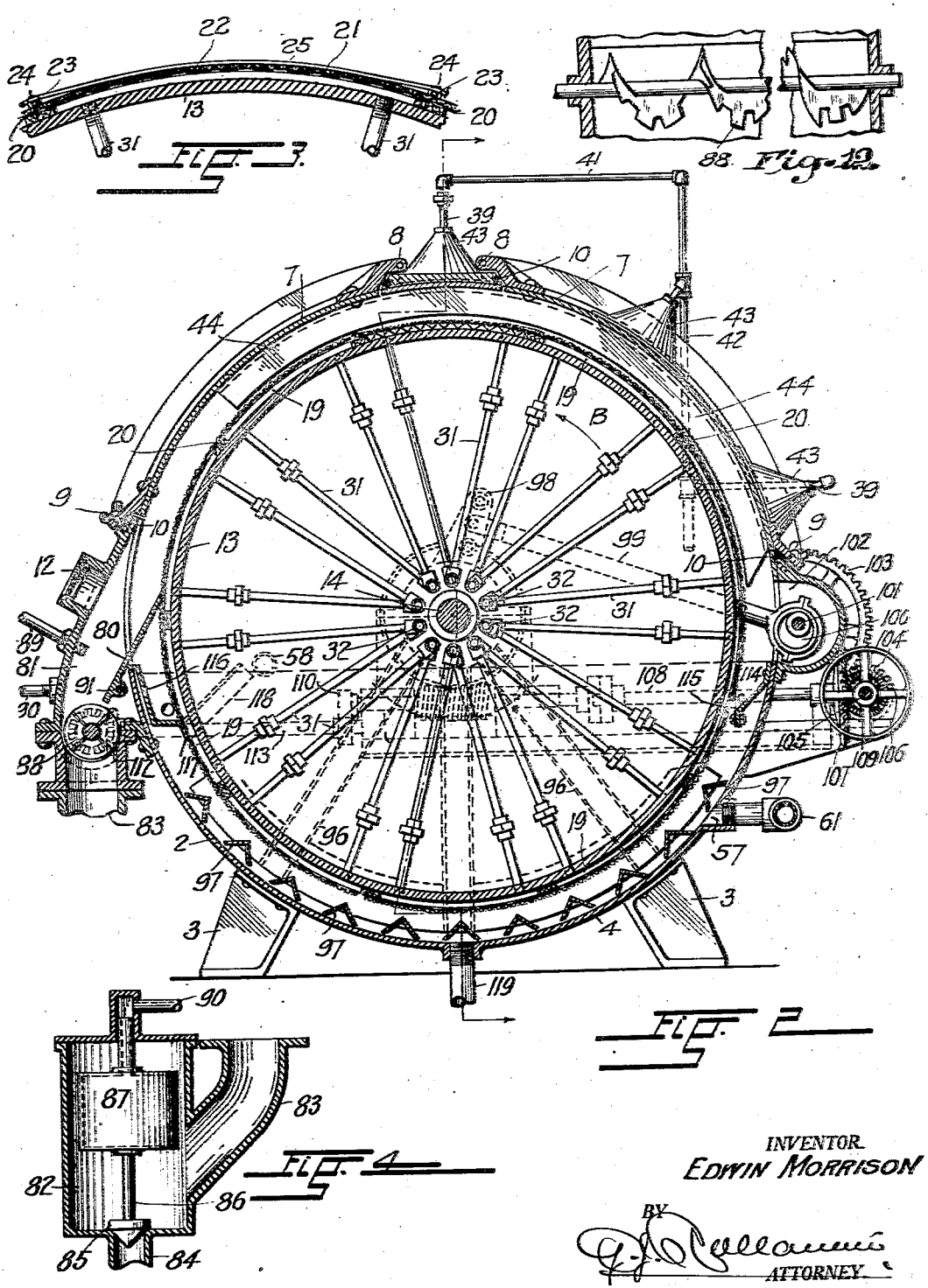

INVENTOR.
EDWIN MORRISON.
BY
ATTORNEY.

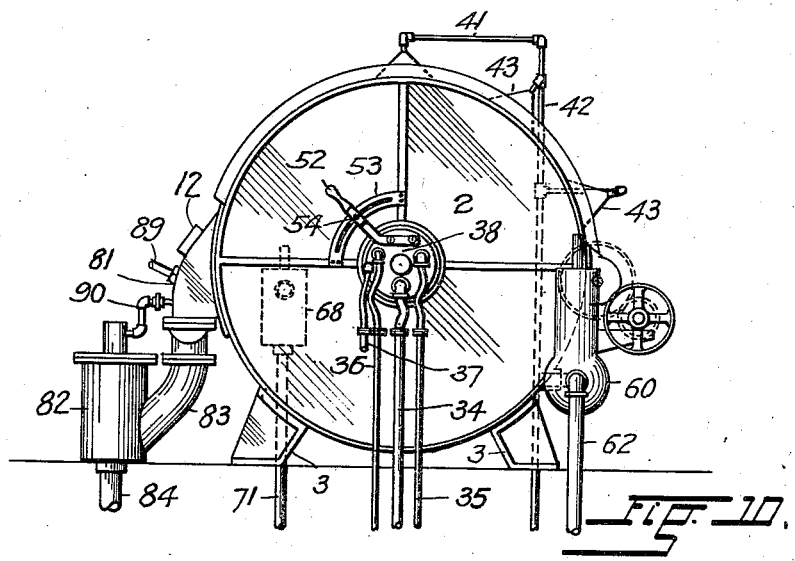
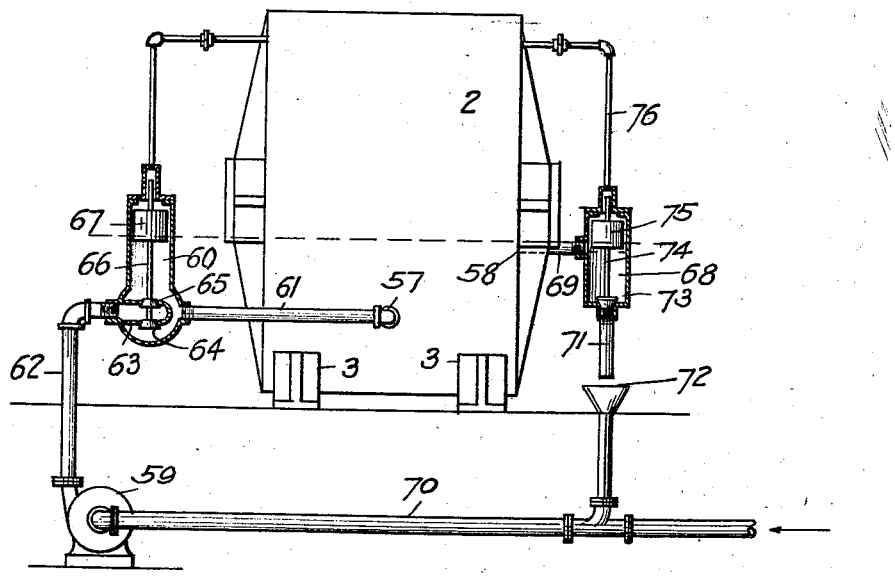

Patented Nov. 11, 1924.

1,515,130

UNITED STATES PATENT OFFICE.

EDWIN MORRISON, OF DENVER, COLORADO, ASSIGNOR TO THE GREAT WESTERN SUGAR COMPANY, OF DENVER, COLORADO, A CORPORATION OF NEW JERSEY.

FILTER.

Application filed July 21, 1920. Serial No. 397,827.

*To all whom it may concern:*

Be it known that I, EDWIN MORRISON, a citizen of the United States, residing at Denver, in the county of Denver and State of Colorado, have invented certain new and useful Improvements in Filters, of which the following is a specification.

This invention relates to pressure filters and its primary object is to provide an improved method of filtration by a difference in fluid pressures at opposite sides of a filtering medium which passes periodically through the material to be filtered in a cyclic operation.

Another object of the invention is to provide a simple, practical and highly efficient apparatus for carrying my improved filtration process into effect, and still other objects reside in the provision of different devices, arrangements and combinations of parts all of which assist in effecting a clean separation of liquid from solids carried in suspension therein, by my improved method of filtration.

An embodiment of my invention has been shown in the accompanying drawings in the various views of which like parts are similarly designated and in which—

Figure 5:
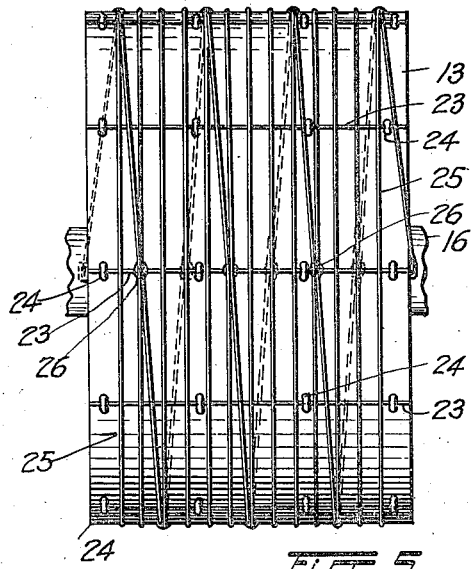
Figure 6:
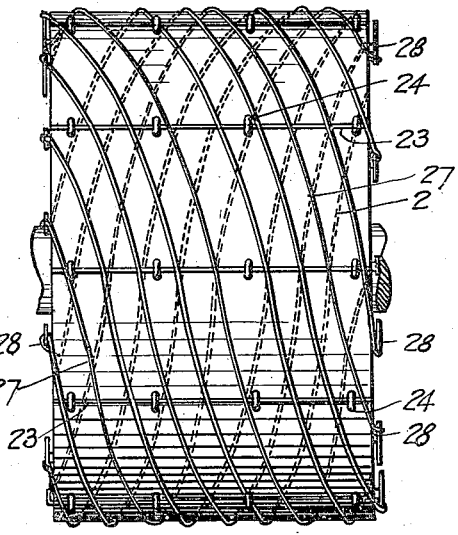
Figure 7:
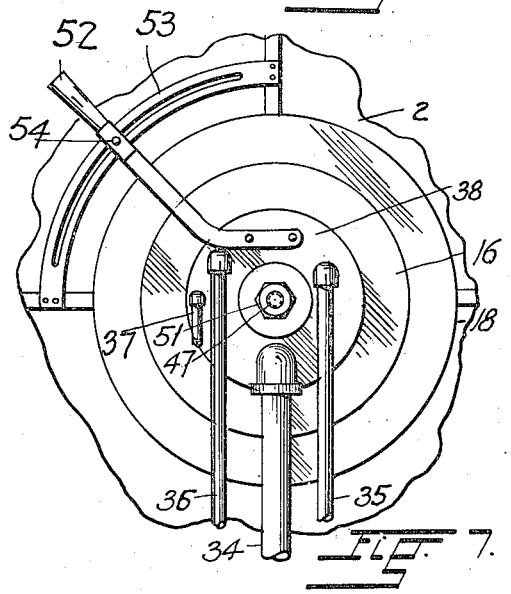
Figure 8:
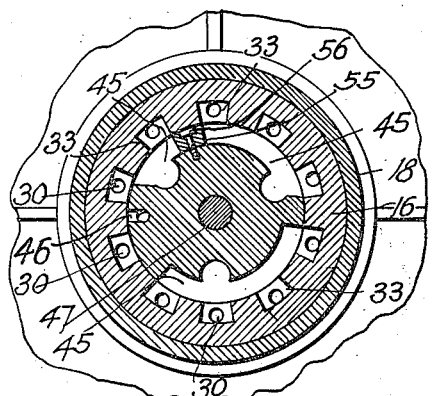
Figure 9:
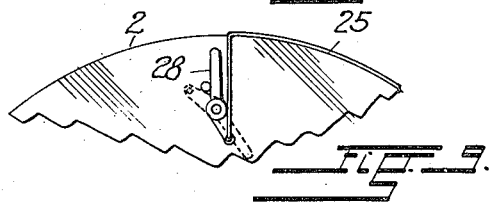

Figure 1 is a vertical section through a pressure filter apparatus constructed in accordance with my invention;

Figure 2, a vertical section taken on the line 2—2, Figure 1;

Figure 3, a transverse section through a part of the peripheral wall of the rotary filter drum of the apparatus drawn to an enlarged scale;

Figure 4, a sectional elevation of a float-controlled valve used in connection with an outlet of the apparatus to provide a liquid seal against the outflow of pressure fluids;

Figure 5, an elevation of the before-mentioned filter drum showing a method of securing the filtering media upon the peripheral surface thereof;

Figure 6, a view similar to that of Figure 5, illustrating another method of attaching the filtering fabric to the drum;

Figure 7, an enlarged end elevation looking in the direction of the arrow A, Figure 1, of the valve of the apparatus which automatically regulates the outflow of liquid expressed in the operation of the filter and the inflow of a pressure fluid which assists in dislodging the filtering residue from the filtering surface of the same;

Figure 8, an enlarged section of the valve taken on the line 8—8, Figure 1;

Figure 9, an enlarged view of one of the clamps used in securing the fastening means illustrated in Figure 6;

Figure 10, an end elevation of the apparatus looking in the direction of the arrow A, Figure 1, drawn to a reduced scale;

Figure 11, an outline elevation of the filter showing in sectional elevation the means employed to automatically maintain the material to be filtered at a determinate liquid level, and Figure 12, a fragmentary vertical section through the cut flight scroll breaker shown in Figure 2.

My improved method of filtration consists briefly in subjecting a moving filtering element and a body of material in which it is partially submerged in an air-tight container, to the influence of a fluid of more than atmospheric pressure which causes the liquid in the material to be expressed from the solids carried in suspension.

The liquid thus separated from the solids with which it was in intermixture is automatically discharged from the container and the residue remaining on the filtering surface is subjected to one or more washes by exteriorly applied liquids which likewise are discharged from the container in separated relation to each other and the filtrate first obtained.

The barren residue is removed from the surface of the filtering element prior to its periodic immersion into the bath of material to be filtered, and automatically discharged from the air-tight casing.

Under certain conditions hereinafter to be described the filtering element is coated prior to its submergence, with a substance adapted to assist the adherence of solids in the material and to provide a protective porous film for the filtering fabric with which the element is covered.

In the preferred form of the apparatus used in carrying out my process, the filtering element consists of a rotary drum mounted inside a cylindrical air-tight casing and having pipe connections between peripheral filter chambers and a concentric member of an automatic valve movement by which the filters are periodically discharged in a cyclic operation.

I desire it understood, however, that I do not limit myself to this exact construction and that variations in the form and construction of the filtering element and the casing in which it has its movement may be resorted to without departing from the principle of my invention. For example, the filtering element may be made of polygonal form or composed of separated members symmetrically arranged to periodically pass through the material to be filtered and the filtering capacity of the element may be increased by placing the filtering media at both the inner and outer surfaces of its circumferential wall and correspondingly arranging the filtrate-receiving compartments and the discharge pipes connected therewith.

Referring more specifically to the drawings the reference character 2 designates an air-tight casing supported in a substantially horizontal position upon pedestals 3 and preferably composed of a cylindrical wall 4 fastened between two upright heads 5 and 6. A pair of doors 7 normally closing openings in the upper half of the circumferential wall of the casing, are hinged as at 8 to an interposed stationary part thereof and they are fastened in their closed position by bolts 9 extending through lips at their opposite ends.

Gaskets 10 of elastic material placed in grooves around the openings of the casing insure an air-tight contact of the doors in their closed position.

The casing is furthermore provided with one or more glass-covered peep-holes such as that shown at 12 in Figure 2, through which the condition of internally located parts of the filtering mechanism may be observed while the machine is in operation.

A cylindrical filter drum 13 disposed inside the casing in spaced relation to the walls thereof, is mounted on a shaft 14 which at one end of the drum is supported in a bearing 15 formed on the adjacent head of the casing.

The other end of the drum has a hollow trunnion 16 which is rotatably fitted in a bearing 17 on the opposite head of the casing and which provides the moving member of the automatic valve mechanism of the filtering apparatus, hereinafter to be described.

Both bearings are equipped with stuffing boxes 18 of suitable construction to prevent leakage of the pressure fluid in the operation of the machine.

The circumference of the drum is divided into a plurality of compartments 19 by longitudinal dividing strips 20 which are equidistantly spaced upon the peripheral surface thereof.

Suitable filtering media preferably composed of a woven wire screen 21 and a covering of foraminous fabric 22, are stretched tightly over the circumferential surface of the drum in contract with the longitudinal dividing strips thereof.

The filter media are attached to the drum by longitudinal rods 23 which are fastened upon the dividing strips by staples 24, and they are furthermore held in place by windings of wire preferably arranged and fastened by either of the methods illustrated in Figures 5 and 6 of the drawings.

The arrangements shown in Figure 5 is produced by first fastening a wire 25 at an edge of the drum and then winding it spirally around the same through one convolution or any desired part thereof to a point 26, whence it is wound circumferentially through a complete revolution and soldered or otherwise fastened upon itself at said point.

The wire is now wound again spirally and circumferentially in parallel relation to the first convolutions and again fastened upon itself and the alternate spiral and circumferential windings are repeated until the entire surface of the filtering fabric has been covered by a wire netting.

It will be seen that in the above-described manner a netting covering the entire filtering surface may be produced of one continuous piece of wire which is fastened upon itself at regular intervals so that in case any one of the windings of the netting breaks, its other parts remain intact and prevent loosening of the filtering media around which it is applied.

The wire netting shown in Figure 6 of the drawings is composed of a plurality of strands of wire 27 helically wound upon the surface of the filtering fabric in parallel and spaced relation to each other and fastened at the end of the drum by tightening devices such as the lever 28 shown in Figure 9.

The last-described method of fastening the filtering media is particularly adapted for drums having a large diameter in ratio to their length.

The hollow trunnion 16 of the drum has at a distance from its outer end an interior transverse head 29 provided with a circularly arranged series of openings 30 corresponding in number to the peripheral compartments of the drum.

Each compartment has two openings preferably at diagonally opposite points and these openings are connected to the corresponding openings of the head 29 by interconnected pipes 31 and 32. The openings of the head are separately connected with ports 33 formed in a conical surface in the end portion of the trunnion and the trunnion thus constructed constitutes the moving member of the automatic valve by which the different compartments of the drum are periodically placed in communication with liquid discharge conduits 34, 35 and 36 and a supply pipe 37 for air under pressure, each connected to the stationary member 38 of the valve which fits within the conical surface of the trunnion and which will hereinafter be more fully described.

In the operation of a filter, a wash water is supplied to the circumferential surface of the rotary drum through a plurality of nozzles 39 which enter through openings in the circumference of the casing above a predetermined level of material contained in the lower portion of the same.

The nozzles are placed successively with relation to the direction of the rotation of the drum so that during the rotary movement thereof each part is subjected to two or more consecutive washes after it emerges from the material to be filtered.

The nozzles may be connected to one and the same source of supply by interconnected pipes 41 and 42 as shown in Figures 1 and 2 of the drawings, or they may be connected so that the wash water supplied to the first nozzle is conducted successively to the other nozzles after being discharged from the compartments of the drum, principally for reasons of economy.

It is essential in the operation of the filter that the wash water be applied to the residue cakes formed upon the circumference of the drum, in very fine and gentle sprays. The space inside the casing around the drum is generally too narrow to afford the distance required to attain this result, and the circumferential wall of the casing is therefore extended outwardly to provide funnel-shaped recesses or entrance chambers 43 at the apexes of which the spraying nozzles are applied.

In order to prevent spilling of wash waters beyond the edges of the filtering surface of the drum, splash boards 44 are fastened to the casing at opposite sides of the washing zone defined by the position of the nozzles.

The automatic valve hereinbefore partially described, controls the discharge of the filtrate and the wash waters from the compartments of the drum and also provides for a periodic supply of air under pressure to the compartments to assist in dislodging the residue cakes from the filtering fabric stretched across the same.

It is obviously essential that the filtrate and the wash waters are separately discharged at different periods in the cycle of operations, and the conical stationary valve member 38 has with this end in view, three circumferential channels 45 divided by interposed partitions and adapted to register with the series of ports in the rotary valve member which are connected with the several compartments of the drum by the pipes 31 and 32.

A narrow groove 46 in the partition between two of the passages 45 connects with the before-mentioned pipe 37 for the supply of air under pressure and likewise registers with the series of ports in the conical surface of the trunnion.

The stationary valve member is supported upon a stud 47 projecting axially from the end of the shaft of the drum and a spring 48 placed between said member and a pair of washers 49 and 50 engaged by a nut 51 at the threaded end of the stud, serves to yieldingly maintain the channeled surface of the member in contact with the ported conical surface of the rotating trunnion.

A series of balls interposed between the washers reduces friction between the rotary parts and the relatively stationary valve member and spring.

The three passages 45 of the stationary member of the valve connect respectively with the pipe 34 for the discharge of the first filtrate expressed from the residue cake on the drum, the pipe 35 for the discharge of the first wash water supplied through one or more of the nozzles in the circumference of the casing, and the pipe 36 for the discharge of the wash water supplied through the other nozzle or nozzles on the same, and the groove 46 connects with the pipe 37 which communicates with a supply of air under pressure as stated hereinbefore.

The valve-member is held in its operative position by a laterally projecting arm 52 which is fastened upon a slotted segment 53 by a set bolt 54 or other suitable device and the conduits connected with the member have a certain degree of flexibility so that by adjustment of the arm on the segment the position of the valve member may be changed to vary the successive periods of liquid discharge and air supply in the cycle of operations of the filter.

The periods of discharge of the wash waters may furthermore be varied by the adjustment of the partition 55 dividing the passages connected with the pipes 35 and 36, which to this end is made separate from the body of the valve member and detachably fastened thereto by a screw 56.

In the operation of the filter the material is fed into the lower portion of the casing through an intake opening 57 and rises to a predetermined level established by an overflow opening 58 in one of the heads which close the ends of the casing.

The inflow of material through the inlet opening is automatically regulated by a float valve interposed between said opening and a pump 59 which feeds the material to the machine.

The valve as shown in Figure 11 of the drawings, consists of a chamber 60 having an outlet connected with the inlet opening of the casing by a pipe 61 and provided opposite to said outlet, with an intake opening which is connected with the pump by a pipe 62.

A dividing wall 63 formed around the intake opening has two alined ports which provide passages for the inflowing material to the outlet opening and which are covered by the members 64 and 65 of a balanced valve fastened to the downwardly extending rod 66 of a float 67 placed on a level with the overflow opening 58.

It will be seen that when the material in the casing falls below the level determined by its overflow, the valves are automatically opened by the downward movement of the float to increase the supply of material to the intake opening of the casing. The valve furthermore serves as a liquid seal which prevents the return flow of material from the casing by internal pressure.

The overflow opening 58 is likewise sealed by a valve-controlled device which permits the outflow of liquid but prevents the escape of gas under pressure contained in the casing above the liquid level.

The device as shown in Figure 11, consists of a cylindrical chamber 68 connected with the overflow opening by a laterally extending pipe 69 and having in its bottom an outlet which for convenience is connected with the feed pipe 70 of the pump.

The connection is established through the medium of a vertical pipe 71 which is broken as at 72 to permit of observing the operation of the sealing device.

The flow through the outlet of the chamber 68 is controlled by a valve 73 fastened at the lower end of the rod 74 of a float 75 placed on a level with the overflow opening.

When the material in the casing rises above the predetermined level the upward movement of the float causes the valve to be lifted off its seat, with the result that the surplus material is discharged through the outlet until the normal level is restored. Should the material in the casing fall below the predetermined level, the valve 73 closing the outlet, prevents the outflow of pressure gases contained in the upper portion of the same and it remains in its closed position until the material fed into the intake opening has again risen in the casing to the level of its overflow.

A pipe 76 connecting the upper end of the valve chamber with the space of the casing above the liquid level equalizes the pressures upon the liquids in the casing and the chamber.

It will be apparent that the two controlling devices connected with the intake and overflow openings of the filter casing cooperate to maintain the material continuously at a predetermined level, while preventing the outflow of the pressure fluid contained in the upper portion of the casing in the operation of the machine.

The pressure fluid preferably consisting of steam, compressed air or other gas of more than atmospheric pressure is introduced into the upper portion of the casing through a pipe 77 equipped with the usual pressure regulating valve which being of well known construction has not been shown in the drawings.

The fluid presses uniformly upon the bath of liquid material in the lower portion of the casing and upon the exposed surface of the filtering drum which in the operation of the machine is slowly rotated in the direction of the arrow B in Figure 2, through the instrumentality of a worm movement 78—79 at the end of its shaft, projecting beyond the bearing 15 of the casing.

The pressure of the fluid in the upper portion of the casing drives the liquid in the material contained in the lower portion of the same and carried upon the circumferential surface of the drum, through the interstices of the filtering media with which the drum is covered and into the compartments at the circumference of the same. Wash waters which are constantly supplied through the nozzles are by the same fluid pressure driven through the solid residue of the material adhering to the filtering fabric and carry any remaining liquid into the compartments of the drum, it being understood that the pressure under which the wash waters enter the casing must necessarily be greater than that of the air or other fluid in the upper portion of the same.

During the period that each compartment of the rotating element travels through and above the bath of material in the casing prior to the application of the first wash water, the pipes which connect it with the rotary valve member in the trunnion 16 are placed in connection with the discharge pipe 34 by the registration of the respective ports with the passage in the stationary valve member connecting with said pipe.

The filtrate which entered the compartment through the filtering fabric by the external fluid pressure is thus forcibly discharged from the filter until at the time the compartment reaches the zone of the first wash, the respective port has moved in register with the passage of the stationary valve member connected with the discharge pipe 35.

The second wash water is in like manner discharged separate from the other and the cycle of operations is completed by the registration of the port of the compartment with the groove 46 of the valve member for the supply of air under pressure which entering through the respective pipes 31 and 32 assists in dislodging the now barren residue cake for its removal from the circumferential surface of the drum.

The removal of the mud cakes is effected by a scraper 80 aided by the "back blow" of air hereinbefore explained, and the residue is discharged from the casing through a downwardly directed outlet passage 81 formed immediately above the liquid level of the casing at the point at which the drum reenters the bath in the cyclic operation.

A suitable device is connected with the outlet of the casing to permit of the outflow of material without reduction in the pressure above the liquid level and in order to facilitate the operation of said device I provide a means to break the cakes into small particles prior to their entering the same, and if necessary introduce a current of water into the outlet passage to assist the outward movement of the solids.

An appropriate form of the controlling device has been shown in Figure 4 of the drawings in which the reference numeral 82 designates a cylindrical chamber connected with the outlet of the casing by a branch 83 and having a discharge opening 84 in its bottom surface.

A valve 85 connected to the downwardly extending rod 86 of a float 87 is adapted to close the opening and maintain a liquid level in the chamber which prevents the outflow of gases from the space above the liquid level in the casing.

The breaking device which is disposed between the outlet of the casing and the controlling medium, consists in the construction shown in the drawings of a revolving cut flight scroll 88 and the current of water to assist in the outward flow of the material is supplied through a pipe 89. A cut flight scroll breaker of conventional construction has been shown in Figure 12 of the drawings.

A pipe 90 connected in the upper portion of the chamber 82 with the pressure space of the casing equalizes the pressure upon the liquids in the two containers.

The scraper 80 is preferably composed of a blade which is pivoted as at 91 to engage the peripheral surface of the drum by gravity.

In case the hollow filtering drum has solid ends as in the construction shown in the drawings, which is preferable to an open or spoke construction inasmuch as it prevents the material from entering the inside of the drum, it is desirable to have an equalizing pipe 92 connected with the pressure space in the upper portion of the casing and passing through a stuffing box 93 into an axial bore 94 in the end of the shaft projecting beyond the bearing 15 of the casing, the bore having a lateral branch 95 for its connection with the interior of the drum.

A swinging agitator suspended from the trunnions of the shaft by arms 96 extending in the spaces between the ends of the drum and the casing, includes at the ends of said arms an arcuately arranged series of parallel rabbles 97 of inverted V-shaped section which extend in the space between the circumferential surface of the drum and the bottom portion of the casing.

Rocker arms 98 extending upwardly from the arms 96 are pivotally connected with rods 99 of eccentrics 100 mounted on a shaft 101 which extends in a recess 102 of the peripheral wall of the casing above the liquid level.

The shaft 101 which is supported in boxes at the ends of the recess carries exteriorly of the same a gear-wheel 103 which meshes with a corresponding gear 104 on a driving shaft 105.

Beveled gear wheels 106 and 107 connect the driving shaft with the shaft 108 of the worm 78 by which the filter drum is rotated as hereinbefore explained, and a pulley 109 is provided to connect the driving shaft with a conveniently located source of mechanical energy.

The agitator serves in the operation of the machine to prevent the solids in the material under treatment from settling out of suspension and thereby assists their ready adhesion to the filtering fabric on the circumference of the drum.

The revolving cut scroll breaker 88 which disintegrates the solid residue removed from the filtering surface before it passes the float controlled valve 85, is operatively connected with the worm shaft through the medium of a transmission mechanism preferably consisting of gear-wheels 110 and 112 two of which are mounted at opposite ends of a shaft 113.

The gear wheels of the transmission are proportioned to transmit the rotary motion of the worm shaft to the rotary breaker at a greatly increased velocity.

In order to prevent the wash water supplied through the nozzles from flowing downwardly along the circumferential surface of the drum into the material in the lower portion of the casing, a trough 114 is longitudinally disposed in the space between the circumferential surface of the drum and the casing at a point beneath the first nozzle of the series, with reference to the direction of rotation of the drum.

The trough extends inwardly from the side of the casing along the entire length thereof and it consists of a rigid body part which is attached to the casing and a flexible apron 115 made of rubber, leather or other suitable material which bears loosely against the circumferential surface of the filtering drum.

The upper edge of the trough is on a level with the water line of the casing or slightly above the same, and an opening in the end of the trough provides for the drainage of accumulated water.

Another distinctive feature of the present invention is the provision of a means for coating the filtering surface prior to its immersion in the bath of liquid and solids in the lower portion of the casing, principally for the purpose of protecting the filtering media from the corrosive or otherwise destructive action of certain materials.

The means referred to consist in their preferred form of a trough 116 placed in the space between the circumferential wall of the casing and the filtering surface of the drum at the downwardly moving side thereof.

The trough is positioned on a line with or slightly above the liquid level of the casing, determined by its overflow, and it consists of a rigid side plate connected to the casing and a bottom plate extending to within a short distance from the periphery of the drum.

A flap 117 connected at the edge of the bottom plate extends in close proximity to the surface of the filtering fabric on the circumference of the drum, thereby providing a narrow passage for the adherent matter on the surface of the drum and reducing the possibility of the coating substance entering the bath in the bottom portion of the casing.

It will be apparent that by changing the proportions and position of the flap, the coating may be applied to the filtering surface in any desired thickness.

Flexible extensions 118 of the trough beyond the ends of the drum lightly engage therewith to provide a substantially tight joint without unnecessary friction.

The coating substance which is supplied to the trough through an opening in the end of the casing may consist of an infusorial earth, Kieselguhr, Fullers earth, finely powdered minerals, sand, sawdust, etc., each of which is suitable for the purpose in the treatment of different materials.

A drain pipe 119 at the bottom of the casing provides an outlet for the material when it is desired to empty the machine.

As the operation of the filtering machine has been referred to at intervals in the course of the foregoing description, it will only be necessary to outline it very briefly at this point.

The material continuously pumped into the casing through the inlet pipe 61 is maintained at a level predetermined by the overflow opening, by the automatic controlling devices, and a pressure fluid such as compressed air, steam or other gas of more than atmospheric pressure is at the same time introduced into the upper portion of the casing through the inlet 77.

The pressure of the fluid upon the material in the lower portion of the casing and upon that adhering to the circumferential surface of the continuously rotating filtering drum, causes the liquid in the material to pass through the filtering media into the compartments at the circumference of the drum while the solids which are maintained in suspension in the liquid by the movement of the agitating appliance, remain on the filtering surface in a layer of variant thickness.

After the drum emerges from the bath of material in the bottom portion of the casing, the solids carried thereon are subjected to one or more washes by water supplied through the nozzles 39 to express therefrom any remaining soluble solids and before the drum reenters the bath the remaining barren residue is removed from its surface by the scraper aided by the pressure of air supplied through the pipes 31 and 32.

The separated residue passes from the casing through the outlet 81 which is sealed against the outflow of gases by the float valve 85, and its outward movement is accelerated by the disintegrating action of the breaker and the supply of sludge water through the pipe 89.

The valve movement automatically times the periods during which the filtrate and the wash waters are discharged and back pressure air is supplied in the cycle of operations of the filter, and the troughs at opposite sides of the drum provide respectively for the application of a coating $a$ to the filtering fabric and the separation of the wash water from the material under treatment as hereinbefore described.

Having thus described my invention what I claim and desire to secure by Letters-Patent is:

1. A filter comprising an air-tight casing adapted to contain a bath of material to be filtered, a moving filtering element in said casing passing through said bath, means for supplying an elastic fluid under more than atmospheric pressure to the casing above the liquid level of the bath, and means for applying by said fluid pressure a protective coating to the filtering surface of the element prior to its immersion.

2. A filter comprising an air-tight casing adapted to contain a bath of material to be filtered and having an outlet for solid residue of filtration, a moving filtering element in the casing passing through said bath, means for supplying an elastic fluid under more than atmospheric pressure to the casing above the liquid level of the bath, means for removing residuant solids from the filtering element to said outlet, a conduit connected with the outlet, a breaker in the conduit, adapted to comminute the solids which passed through the outlet, a water supply connected with the conduit, to reduce the comminuted solids to a fluent state, and a device closing the conduit against the escape of elastic fluid with said fluent matter.

3. A filter comprising an air-tight casing adapted to contain a bath of material to be filtered, a rotary hollow filtering drum in the casing, partially submerged in said bath, the drum being closed at its ends and having a peripheral filtering surface, means for supplying an elastic pressure fluid to the casing, and a conduit connecting the interior of the drum with the space in the casing above the level of the bath.

4. A filter comprising an air-tight casing adapted to contain a bath of material to be filtered, a rotary drum in the casing partially submerged in said bath and having a peripheral filtering surface, means for supplying an elastic pressure fluid to the casing above the level of the bath, and a container for a coating material, in the casing, adapted to apply its contents to said surface of the drum prior to its submergence.

5. In a filter, a filter drum, a filtering medium covering the peripheral surface thereof, and a wire netting comprising a continuous wire wound around the filtering medium in turns which cross each other at intervals and which are connected at their points of intersection.

6. A filter comprising an air-tight casing adapted to contain a bath of material to be filtered, a moving filtering element in said casing, passing through said bath, means for supplying an elastic fluid under more than atmospheric pressure to the casing above the liquid level of said bath, means to apply wash waters separately at different points in the line of movement of the filter element after its emergence from the bath, and a valve synchronizing with the movement of the element and the means for applying the wash waters, to separately discharge the filtrate and each wash water, after they are forced through the filtering substance of the element by said fluid pressure.

7. A filtration process consisting in passing a rotating filter through a bath containing material to be filtered, while both the filter and the material are subjected to the pressure of an elastic fluid above atmospheric, and coating the filtering surface prior to its immersion in the bath with a coating adapted to prevent adhesion of the material to be filtered.

8. A filter comprising an air-tight casing adapted to contain a bath of material to be filtered, a rotary cylindrical filter partially submerged in said bath, a nozzle above the level of the bath to apply a wash water to the filter, and partitions enclosing the space between the casing and the peripheral surface of the filter, in which the wash water is applied, to prevent said water from diluting the material in the bottom of the casing.

9. A pressure filter comprising an air-tight casing adapted to contain a bath of material to be filtered, a rotary filter in said casing, means for supplying a pressure-fluid to the casing exteriorly of said filter, and means for removing adherent matter from the filter surface before it enters into the bath, the casing having an air-tight window opposite to said means, through which the removal of the adherent matter may be observed.

10. A filter comprising an air-tight casing adapted to contain a bath of material to be filtered and having an outlet for solid residue of filtration, a moving filterating element in the casing passing through said bath, means for supplying an elastic fluid under more than atmospheric pressure to the casing above the liquid level of the bath, means for removing residuant solids from the filtering element to said outlet, a conduit connected with the outlet, a breaker in the conduit, adapted to comminute the solids which passed through the outlet, a device closing the conduit against the escape of elastic fluid with the commiunted solids, and a connection in the conduit equalizing the fluid pressure at opposite sides of the breaker.

11. A filter comprising an air-tight casing adapted to contain a bath of material to be filtered to a determinate level, a rotary cylindrical filter in the casing, means for supplying a pressure fluid to the casing above the liquid level, a trough in the casing above the liquid level, extending along the surface of the filter at its downwardly moving side, and a flap at the bottom of the trough, in close proximity to the surface of the filter to apply thereto a coating material contained in the trough and prevent of its entering the bath.

12. A filter comprising an air-tight casing having an overflow outlet determining the liquid level of a bath of material to be filtered, a rotary filter element in the casing, passing through said bath, means for supplying an elastic fluid under more than atmospheric pressure to the casing above the liquid level, and means connected with said outlet to prevent the escape of said elastic fluid through the same.

13. A filtration process consisting in emersing a filtering area on a filter periodically in a cyclic operation, in a bath containing material to be filtered, while both the filter and the material are subjected to the pressure of an elastic fluid above atmospheric, applying different wash waters to said filtering area at different periods after its emergence from the bath, and separately discharging the filtrate and each wash water after having passed through the filter, by the fluid pressure.

14. A filter comprising a casing adapted to contain a bath of material to be filtered, a rotary filter drum concentric in said casing in spaced relation to the circumferential wall thereof, the casing having in the upper portion of said wall, a recess extending outwardly from its interior surface, and a nozzle for the supply of water to the peripheral surface of the drum, at the outer end of the recess.

15. In a filter, the combination of an air tight casing adapted to contain a bath of material to be filtered, a rotary drum in the casing, having peripheral filter compartments, means for supplying a pressure fluid to the casing, means for supplying a wash water to the casing, and a valve for the discharge of filtrate and wash water from the compartments of the drum at different periods in the rotary movement of the same, comprising two concentric members spaced one within the other, one of the members being connected to rotate with the drum and having ports in the space between the members separately connected with the compartments of the drum, and the other member being stationary, a partition circumferentially adjustable on one of the members, dividing the space between the members into sections, and means for discharging liquids from said sections.

16. In a filter, the combination of an air tight casing adapted to contain a bath of material to be filtered, a rotary drum in the casing, having peripheral filter compartments, means for supplying a pressure fluid to the casing, means for supplying wash waters to the periphery of the drum at different points of the casing, and a valve for the discharge of filtrate and wash water from the compartments of the drum at different periods in the rotary movement of the same, comprising two concentric members spaced one within the other, one of the members being connected to rotate with the drum and having ports in the space between the members separately connected with the compartments of the drum, and the other member being stationary and having a plurality of partitions dividing the space between the members into sections for the separate discharge of the filtrate and the wash waters, a partition of said plurality being circumferentially adjustable on the member to vary the period of discharge of the wash waters, and means for discharging liquids from the sections of the space.

17. In a filter, the combination of an air tight casing adapted to contain a bath of material to be filtered, a rotary drum in the casing, having peripheral filter compartments, means for supplying a pressure fluid to the casing, means for supplying wash waters to the periphery of the drum at different points of the casing, and a valve for the discharge of filtrate and wash water from the compartments of the drum at different periods in the rotary movement of the same, comprising two concentric members spaced one within the other, one of the members being connected to rotate with the drum and having ports in the space between the members separately connected with the compartments of the drum, and the other member being stationary and having partitions dividing the space between the members into sections, one of said partitions having an opening adapted to register with the ports of the other member, a source of pressure fluid connected with said opening, and means for discharging liquids from the sections of the space.

In testimony whereof I have affixed my signature.

EDWIN MORRISON.